UNITED STATES PATENT OFFICE.

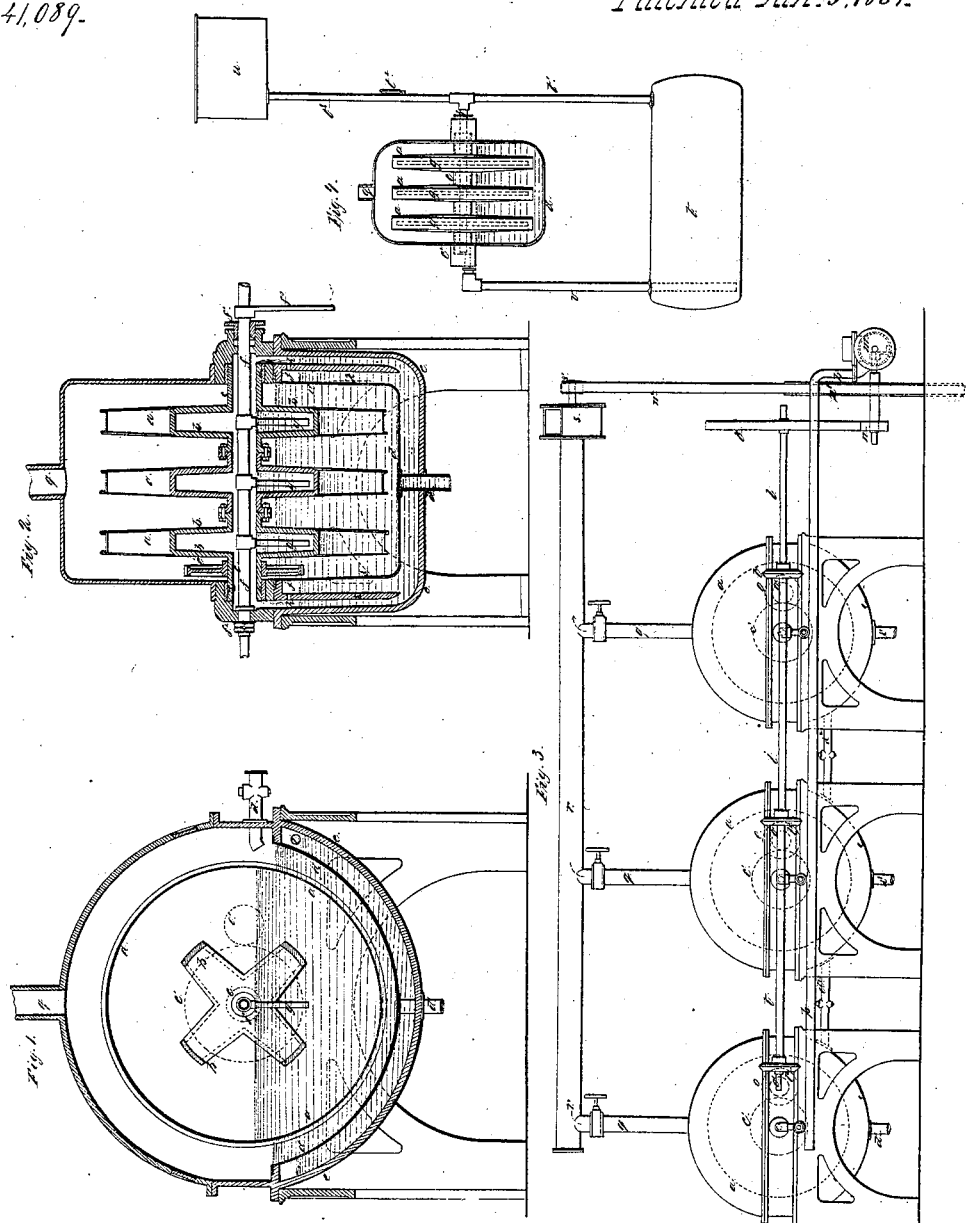

ALFRED PEEK, OF MANCHESTER, ENGLAND.

IMPROVEMENT IN APPARATUS FOR EVAPORATING LIQUIDS.

Specification forming part of Letters Patent No. 41,089, dated January 5, 1864.

*To all whom it may concern:*

Be it known that I, ALFRED PEEK, manufacturing chemist, of the city of Manchester, in the county of Lancaster, in that part of the United Kingdom of Great Britain and Ireland known as "England," have invented certain Improvements in Apparatus for Evaporating Saccharine and Saline Solutions; and I hereby declare the following to be a full, clear, and exact description thereof, reference being had to the annexed drawings, forming part of this specification, that is to say—

The nature of my invention consists in certain improved apparatus for evaporating saccharine and saline solutions, in which apparatus the heat necessary for evaporation cannot be raised beyond the boiling-point of water, but it may be kept to any required degree below that temperature.

In order that my invention may be fully understood and readily carried into operation, I will proceed to describe the accompanying sheet of drawings, reference being had to the figures and letters marked thereon.

Figure 1 is a front elevation, and Fig. 2 is a side elevation, (both in section,) of my improved evaporating apparatus. Fig. 3 represents an elevation of three of my improved apparatuses, working together or in succession.

$a\ a\ a$ are three hollow disks or agitators, made by preference of sheet-copper, attached by rivets or otherwise to the arms $b$ of the hollow axle $c$. I wish to remark that the agitator may be composed of a greater or less number of hollow disks. The agitator revolves slowly in the pan $d$, which is placed within the outer pan, $e$. The steam-pipe $f$ passes through the hollow axle $c$, and it is supplied at one end with a stuffing-box, $f'$, and at the other end with two lock-nuts, $f^2$, and a shoulder to prevent the leakage of steam or water through the outer casing of the apparatus.

To the pipe $f$ are connected the three branch pipes $g$, which are open at their ends to convey the steam from the pipe $f$ to the hollow disk $a$. This steam as it condenses into water overflows into the passages $h$ at each end of the hollow axle $c$, which convey the water into the space between the pan $d$ and outer pan, $e$. The overflow is carried off through the orifice $i$ and through a siphon pipe or trap.

The small orifices $j\ j$ in the partitions $k\ k$ are to allow the water to overflow freely into the space between the pans $d$ and $e$. The saccharine or saline solution to be evaporated having been run into the pan $d$ through the supply-pipe $d^3$, (see Fig. 1,) a slow rotatory motion is given to the agitators by means of the shaft $l$, (see Fig. 3,) which is supposed to be driven by the steam-engine $m$, to the crank-shaft of which is fixed a pinion, $n$, gearing into the wheel $l'$ on the shaft $l$. To this shaft are fixed the bevel-wheels $l^2$, gearing into the wheels $o$ fixed outside a small shaft revolving on bearings in the casing of the evaporating apparatus. On these short shafts are also fixed spur-pinions $o'$, gearing into the wheels $c'$ keyed on the hollow axle $c$; or the agitators may be driven in any other convenient manner. The exhaust-steam from the engine $m$ is conveyed by the pipe $p$ to the pipes $f$ and $g$, placed, as before described, within the agitators. This exhaust-steam supplies the heat required for the evaporation.

In Figs. 1 and 2 the branch pipes $g$ are shown vertical, but they may be set to any angle by the attendant acting on the handle $f^3$ fixed to the pipe $f$. The orifices of the branch pipes $g$ may thus be brought nearer to or above the surface of the water in the agitator for the purpose of heating more rapidly at the commencement of an operation. The vapor rising from the saccharine or saline solution in the pans $d$ is carried off by the pipes $q$, which are in communication with the pipe $r$ and fan $s$. This fan is driven by the fly-wheel $n'$ and strap $n^2$, or the pipe $r$ may communicate with a condenser to produce the requisite partial vacuum in the pans $d$. When the requisite degree of evaporation has been obtained, the saccharine or saline solution is run off out of the pans $d$ by the pipe $d'$, (see Fig. 1,) and where two or more of these apparatus are worked in combination with each other, as shown in Fig. 3, the solution, after having been concentrated or partially evaporated in the first pan, is conveyed to the second by the pipe $d^2$, and from the second to the third. The apparatus, instead of being placed on the same level, as shown in Fig. 3, may be placed on different levels to facilitate the running of the solution from one pan to the other. The pipes $d^2$, $p$, and $q$ are furnished with taps or valves to enable any one of the apparatus to be shut off from the others when they are combined.

Fig. 4 represents a modification of my improved apparatus for evaporating saccharine or saline solutions. Under the pan $d$ containing the solution to be evaporated is placed the boiler $t$, which is filled with water and heated in any convenient manner by a furnace or flues or tubes of the usual construction. To the upper part of the boiler $t$ is attached a pipe, $t'$, which conveys the heated water to the pipe $f$, passing as before described through the hollow axle $c$ of the agitator but closed at the end $c'$. The pipes $g$ connected to the pipe $f$ radiate therefrom and distribute the hot water in the hollow disk $a$. The pipe $t'$ is carried upward to the cistern $u$, which is placed above the level of the agitator. To the end $c'$ of the hollow axle $c$ is connected the pipe $v$, which is carried downward to the lower part of the boiler $t$. By this means the agitators are supplied with a current of water heated to any degree required, not exceeding 212° Fahrenheit. The circulation of water is kept up through the agitators by the pipes above described, and the temperature can be ascertained by a thermometer inserted at $t^2$ in the ascending pipe $t'$. The temperature is regulated by the application of heat to the boiler $t$.

The form of the agitators can be greatly varied. The above-described improvements in apparatus for evaporating may be used when the solutions to be evaporated are in open pans or in covered pans furnished with a chimney, or with a pan to produce a draft or in vacuum-pans. When the heating-surface presented by the revolving agitators is considered insufficient, an increased heating-surface may be obtained by inserting a series of steam-pipes in the vessel containing the solution, such steam-pipes to be surrounded by other pipes containing water, the water-pipes being open at one point at least to the atmosphere.

Having thus stated the nature of my invention, and described the manner of performing the same, I wish it to be understood that revolving and other agitators heated by steam have been used before the date of this patent.

I wish to remark that what I claim herein as new, and desire to secure by Letters Patent of the United States, is—

The arrangement of the revolving agitators, hollow shaft, main and branch steam-pipes, and overflow-passages, substantially as herein described, so as to prevent the temperature applied exceeding the boiling-point of water.

In testimony whereof I have hereunto set my hand before two subscribing witnesses.

ALFRED PEEK.

Witnesses:
    H. B. BARLOW,
        *Patent Agent, Manchester.*
    CHARLES A. BARLOW,
        *Draftsman, Manchester.*